United States Patent Office 3,378,637

Patented Apr. 16, 1968

3,378,637

SYSTEM FOR GENERATING SINGLE SIDEBAND PHASE MODULATED TELEGRAPHIC SIGNALS

Kazuo Kawai and Hiroshi Kurihara, Tokyo-to, Japan, assignors to Kokusai Denshin Denwa Kabushiki Kaisha, Tokyo-to, Japan, a joint-stock company of Japan Filed June 12, 1964, Ser. No. 374,602
Claims priority, application Japan, June 17, 1963, 38/30,718
10 Claims. (Cl. 178—67)

ABSTRACT OF THE DISCLOSURE

A system for generating single side-band phase-modulated telegraphic waves by successively applying, in one and the same direction, phase shifts determined respectively in accordance with two possible instantaneous polarities of a telegraphic signal or combinations of respective two possible instantaneous polarities of a plurality of telegraphic signals, to a phase position of the continuous sinusoidal wave in response to significant instants of the telegraphic signal or signals.

This invention relates to a system for generating single sideband phase-modulated telegraphic signals.

Telegraph signals have heretofore been transmitted by means of an amplitude modulation system, a frequency modulation system, or a phase modulation system. On the basis of recent research and developments in various countries, it has been seen that a phase modulation system is accompanied by a minimum influence of noise existing in the transmission line; therefore, communication systems relating to "phase modulation," inter alia demodulation systems, are being developed. The object of this research and developments is a both sideband phase-modulated wave. If a single sideband phase-modulated wave would be obtained, it can be realized that advantages of the single sideband wave, such as improvement of signal-to-noise ratio and maximum efficient use of the transmission band, can be attained in the phase-modulated wave. However, since a telegraph signal is a digital signal and includes lower to higher frequency components, a suitable system for producing such single sideband phase-modulation signal has not yet been developed.

The object of this invention is to provide a system for producing single sideband phase-modulated waves having such advantages, the system being easily applicable to generate any phase modulated signal having multiple quantum phase positions.

The manner in which the foregoing as well as other objects and advantages may best be achieved will be understood more fully from a consideration of the following description of the principle and embodiment of the present invention, taken in connection with the accompanying drawings, in which the same or equivalent members are designated by the same reference characters for simple illustration, and in which:

FIGS. 1(A) and 1(B) are block-diagrams for illustrating fundamental construction of the system according to this invention;

Figures 14, 18A, 18B:
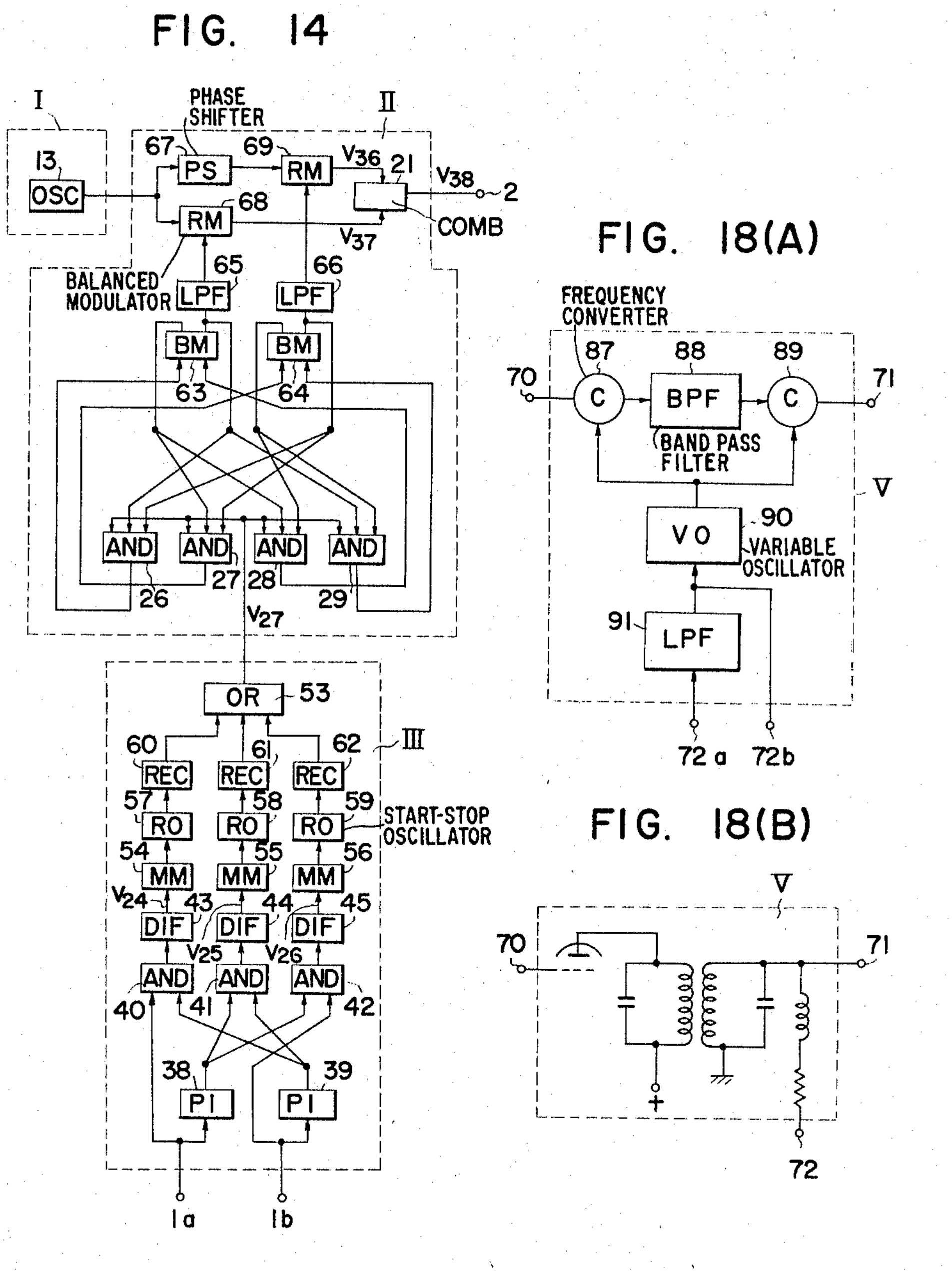
FIG. 14 shows still another embodiment of the invention applicable to the production of four-quantum phase modulated wave.
Figure 17:
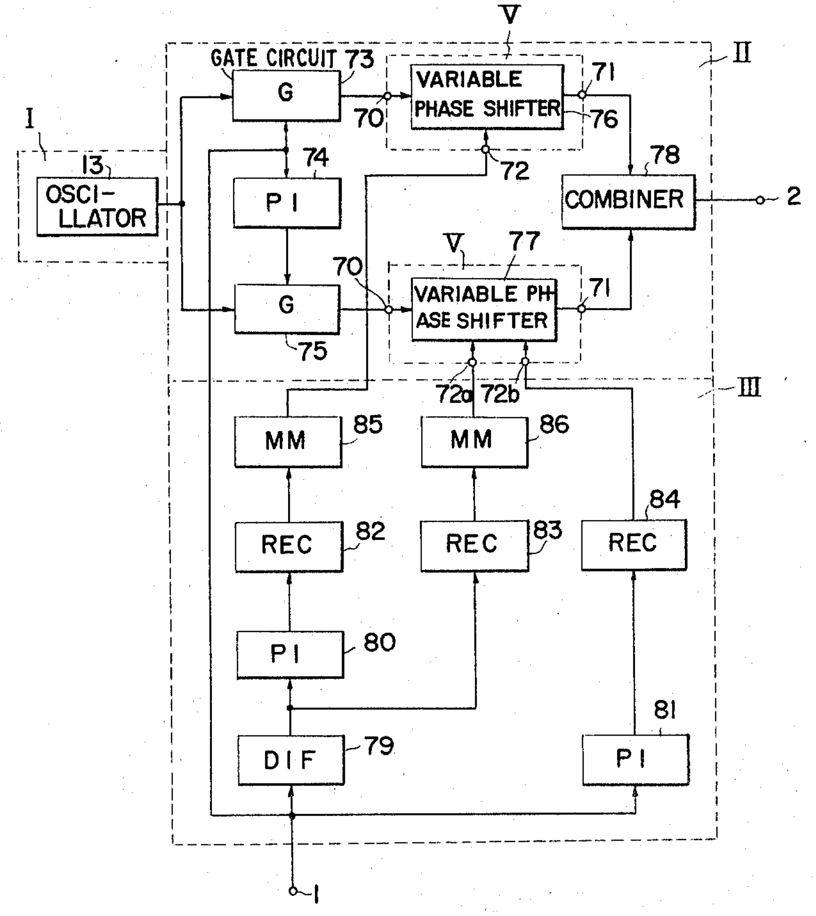
Figure 19:
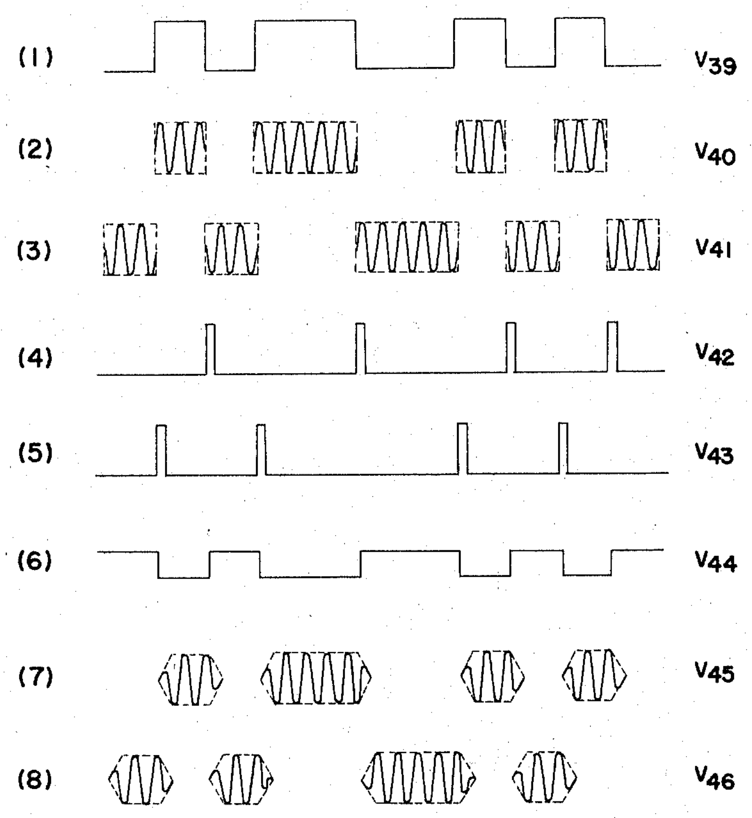
Figure 20:
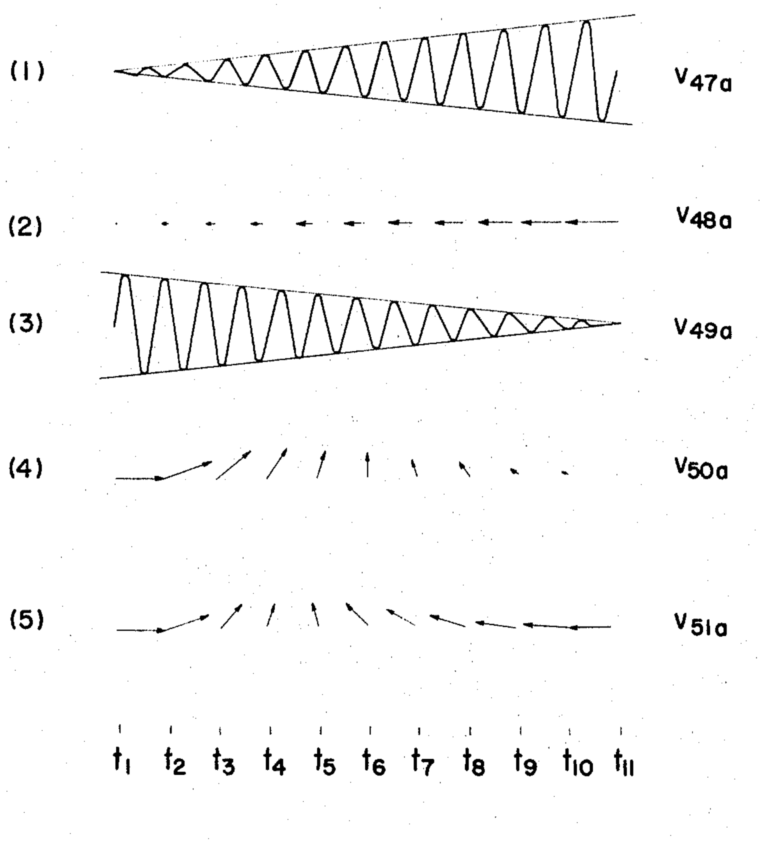
Figure 21:
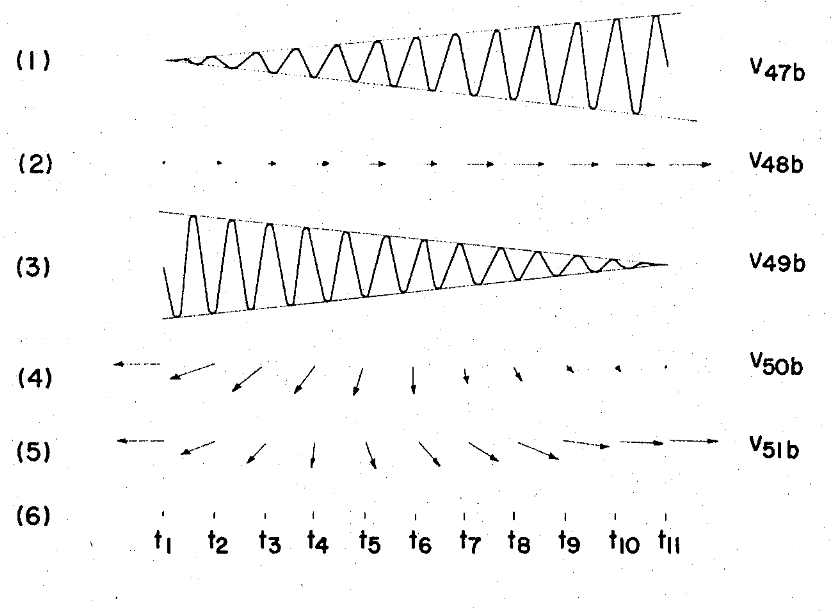

FIGS. 15(A), 15(B), 15(C), 16(A), 16(B), 16(C) and 16(D) show waves or vectors for describing the operation of the embodiment shown in FIG. 14;

FIG. 17 is a block diagram illustrating another embodiment of the invention;

FIGS. 18(A) and 18(B) are diagrams schematically illustrating constructions of a circuit to be used in the system of this invention;

FIGS. 19, 20 and 21 are diagrams illustrating waves or vectors for describing the operations of the embodiments in FIGS. 17, 18(A) and 18(B).

Figure 26:
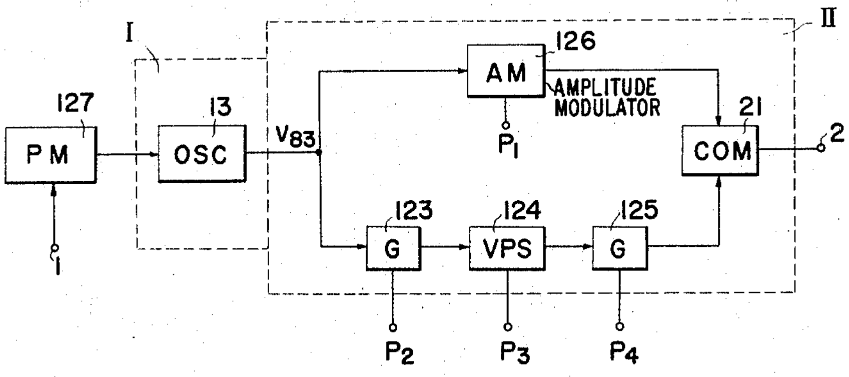
Figure 27:
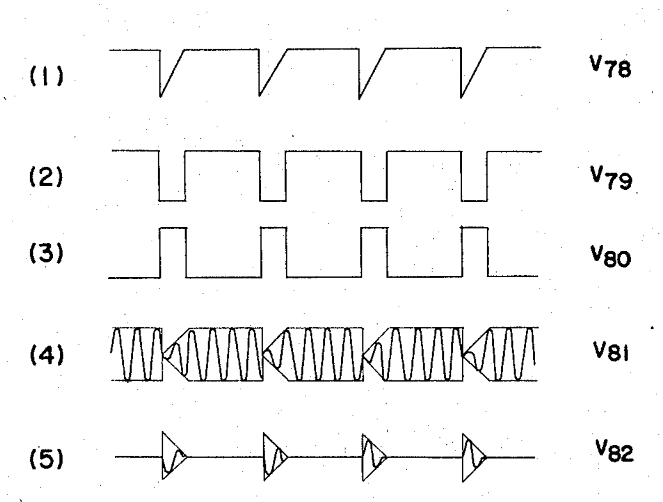
Figure 22:
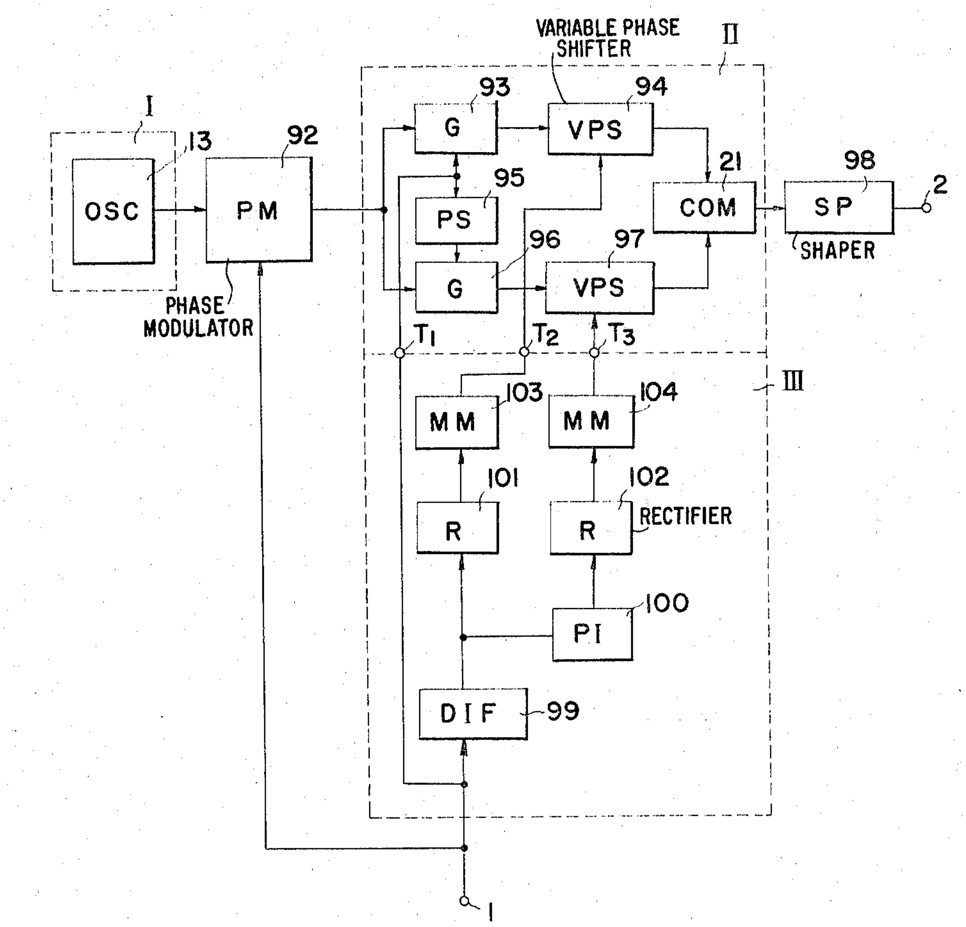
Figure 23:
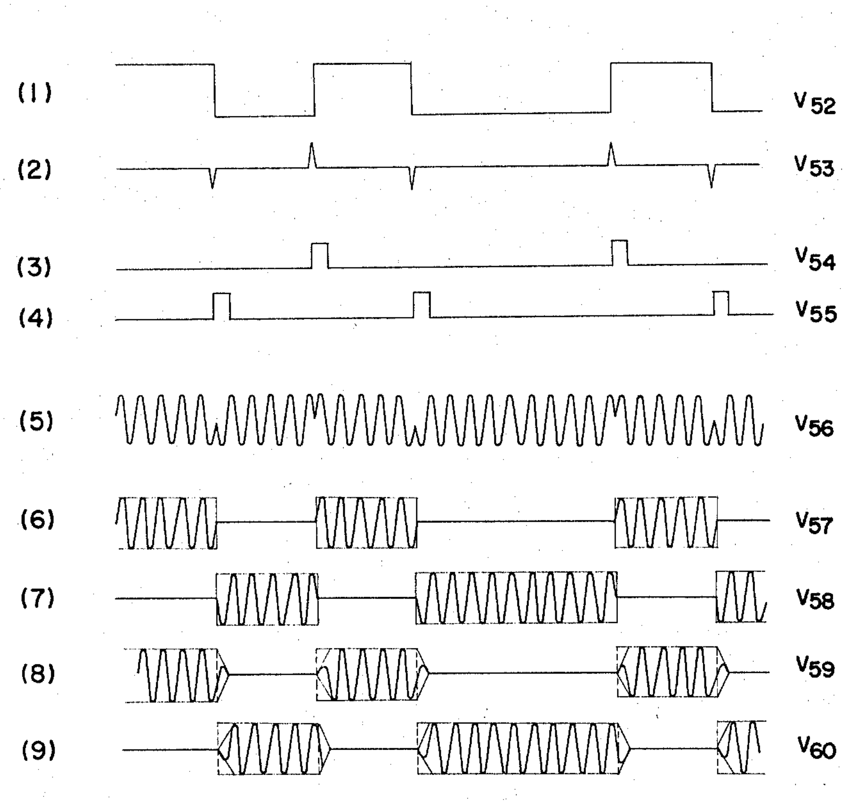
Figure 24:
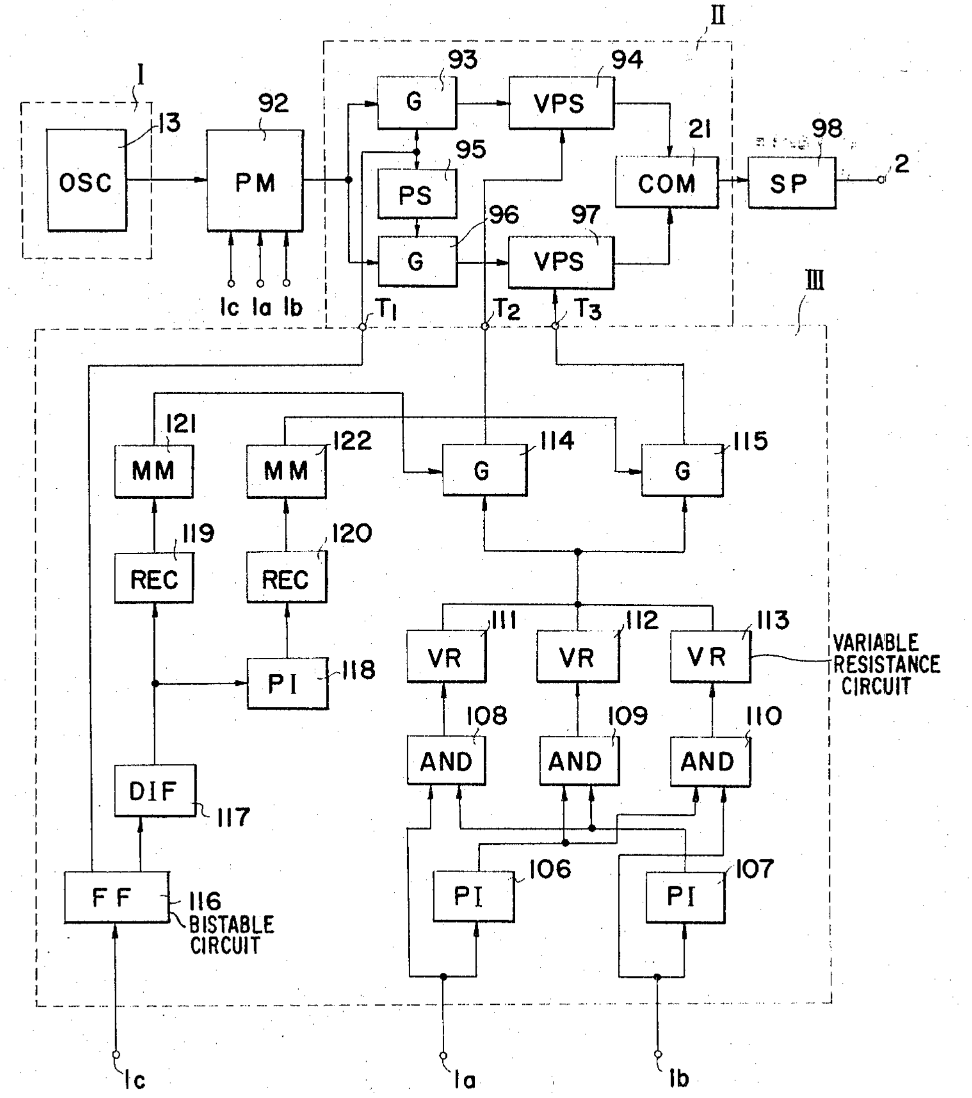
Figure 25:
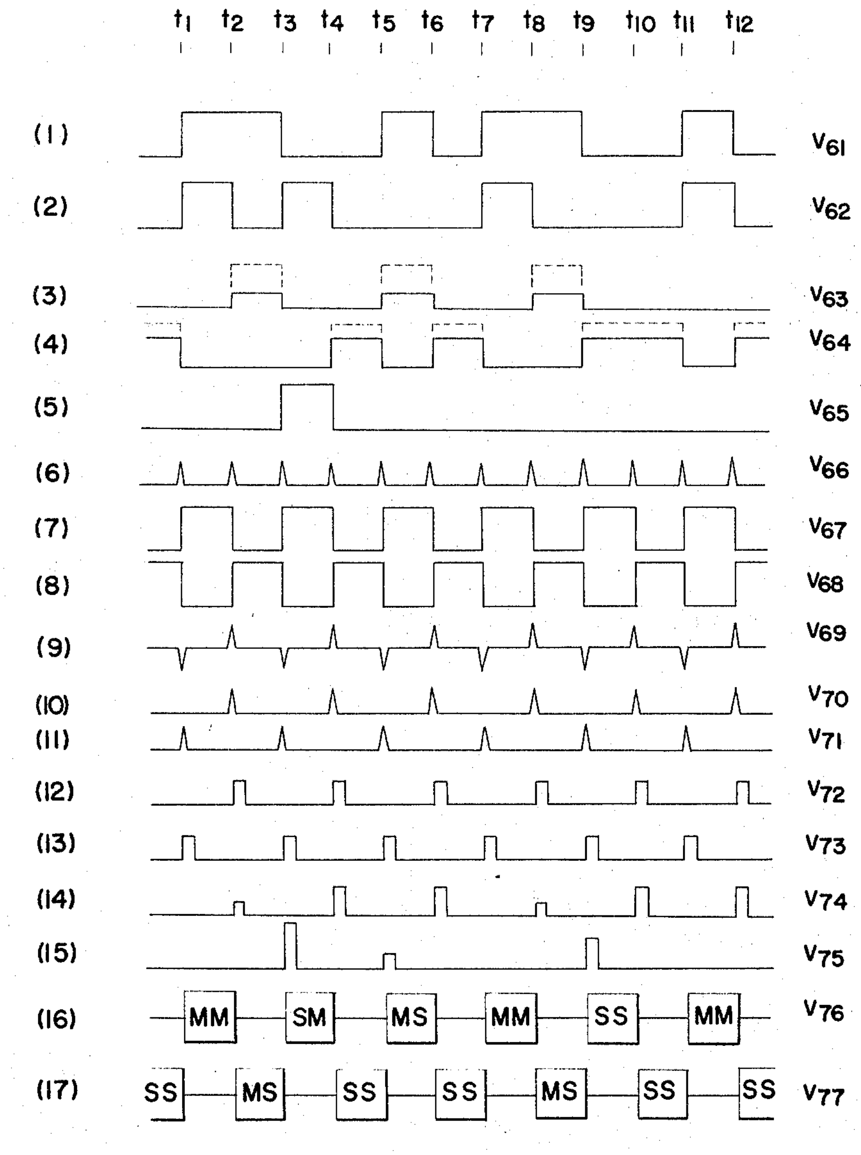

FIGS. 22, 24 and 26 are block diagrams illustrating other embodiments of the invention; and FIGS. 23, 25 and 27 are diagrams illustrating waves for respectively describing operations of the embodiments in FIGS. 22, 24 and 26.

First, fundamental constructions of a generation system for single side-band phase-modulated waves according to this invention are described with reference to FIGS. 1(A) and 1(B). A control signal generator III constitutes means for producing a control signal including a $2^n$ number of information signals respectively corresponding to instantaneous two possible polarities of an input telegraph signal or combinations with respect to instantaneous polarities of the $n$ number of input information telegraph signals in response to significant instants of the telegraphic signal or signals, where $n$ is a positive integer. The input information signal or signals is/are applied to an input terminal 1. When the number $n$ is for example "1" or "2," the $2^n$ number of information signals correspond respectively to "2" or "4." The control signal is applied to a phase shifter II the output signal of which controls a carrier wave generator I so as to shift unidirectionally the phase of the output signal of the generator I; then a phase-modulated wave is obtained from an output terminal 2. In other words, the phase shifter II and the carrier wave generator I correspond to means IV for unidirectionally shifting the phase position of a continuous wave by the use of the control signal derived from the control signal generator III. More particularly, when a plurality of input information signals, if necessary, every code element being synchronized with one another, are applied to the terminal 1, the control signal generator III generates successively one of the $2^n$ number of control signals in accordance with respective combinations with respect to polarities of said input information signals. By the use of said control signals, the phase modulator IV (means IV) causes a continuous carrier wave to shift unidirectionally with respect to successive code elements of input telegraph signals, whereby a single sideband phase-modulated wave including quantum phase positions each corresponding to said polarities of said input information signals (telegraph signal) is obtained at the output terminal 2. FIG. 1(B) shows another fundamental construction composed of the same constructive components as FIG. 1(A) but arranged in a different mutual connection from each other. In this case, the carrier wave generator I and the phase shifter II constitute the phase modulator IV similarly as the system shown in FIG. 1(A).

Figure 1A:
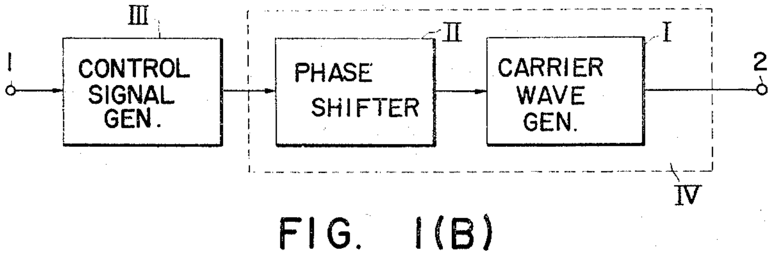
Figure 1B:
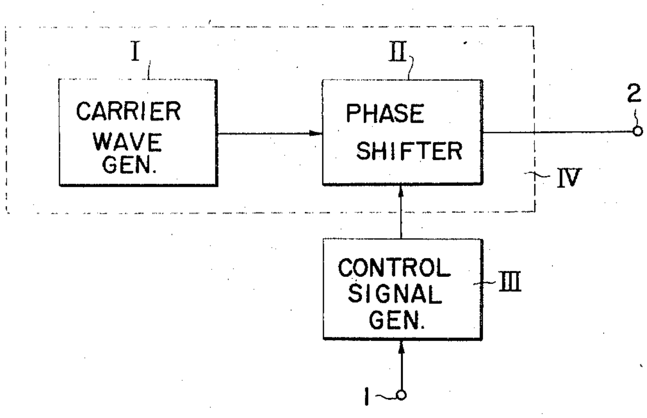
Figure 2:
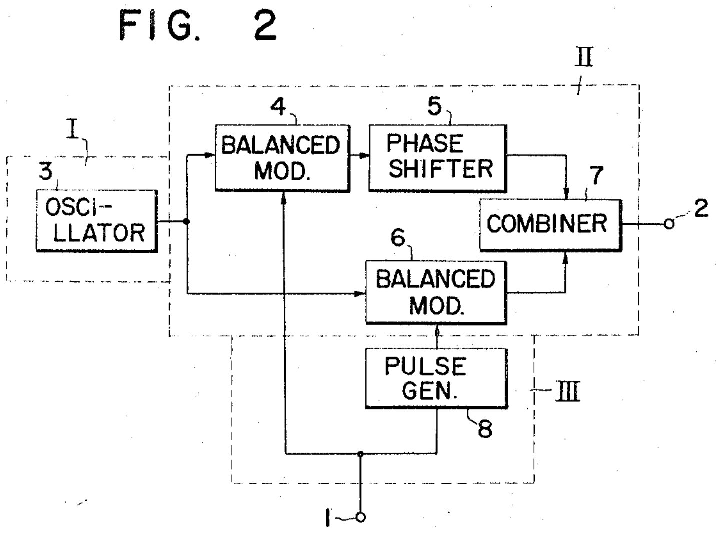
FIG. 2 is a block-diagram showing an embodiment of this invention applicable to the production of two-phase modulated waves.
Figure 3:
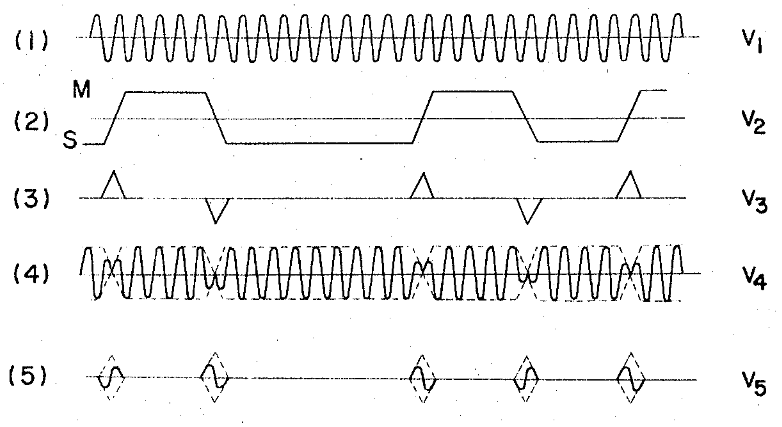
FIGS. 3, 4, 5 and 6 are diagrams illustrating waves or vectors for explaining the operation of the embodiment in FIG. 2.

FIG. 2 shows an embodiment of the system of the invention for generating a single sideband phase-modulated wave having two quantum phases to be used to transmit a single input telegraph signal according to the principle illustrated in FIG. 1(B). The operation of this embodiment is described hereinbelow with reference to wave diagrams and vector diagrams shown in FIGS. 3, 4, 5 and 6. An oscillator 3 generates a continuous wave $v_1$ shown in FIG. 3(1). On the other hand, a telegraph signal $v_2$ shown in FIG. 3(2), in which M is mark-polarity and S is space polarity, is applied from a terminal 1 to both a pulse generator 8 and a balanced modulator 4, such as ring modulator. Accordingly, the pulse generator 8 and the balanced modulator 4 generate, respectively, a pulse signal $v_3$ (FIG. 3(3)) and a modulated signal $v_4$ (FIG. 3(4)). This modulate signal $v_4$ is obtained by causing the carrier wave $v_1$ to shift by 0 radian or by $\pi$ radian in accordance with mark or space polarities of the telegraph signal $v_2$. Dotted lines in FIG. 3(4) show the envelope of the modulation signal wave $v_4$. A wave $v_5$ is the output wave of a balanced modulator 6, said wave $v_5$ showing a mainly phase shift for simple illustration in which dotted lines are the envelope of the wave $v_5$. The modulated wave $v_4$ is phase-shifted by $\pi/2$ radian by means of a phase shifter 5 and then superposed on the wave $v_5$.

Figure 4:
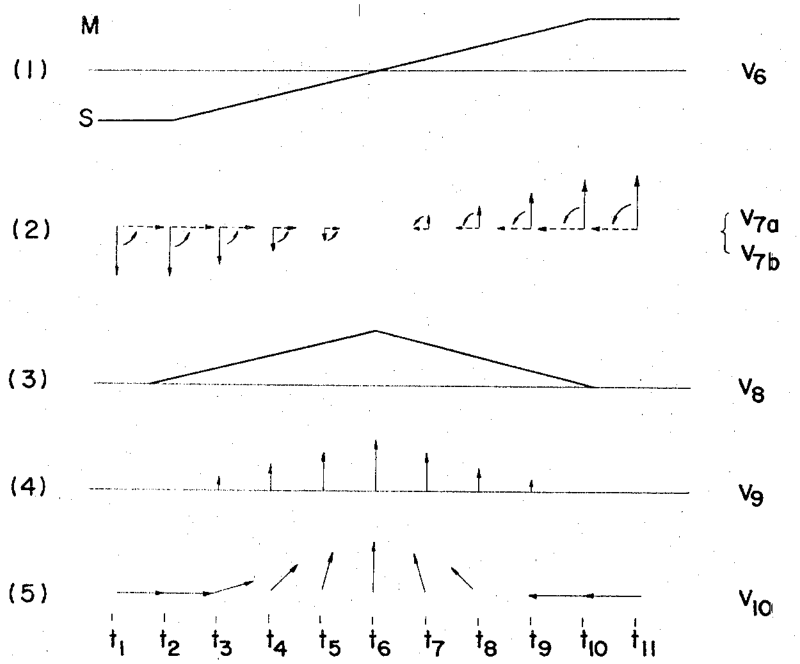
Figure 5:
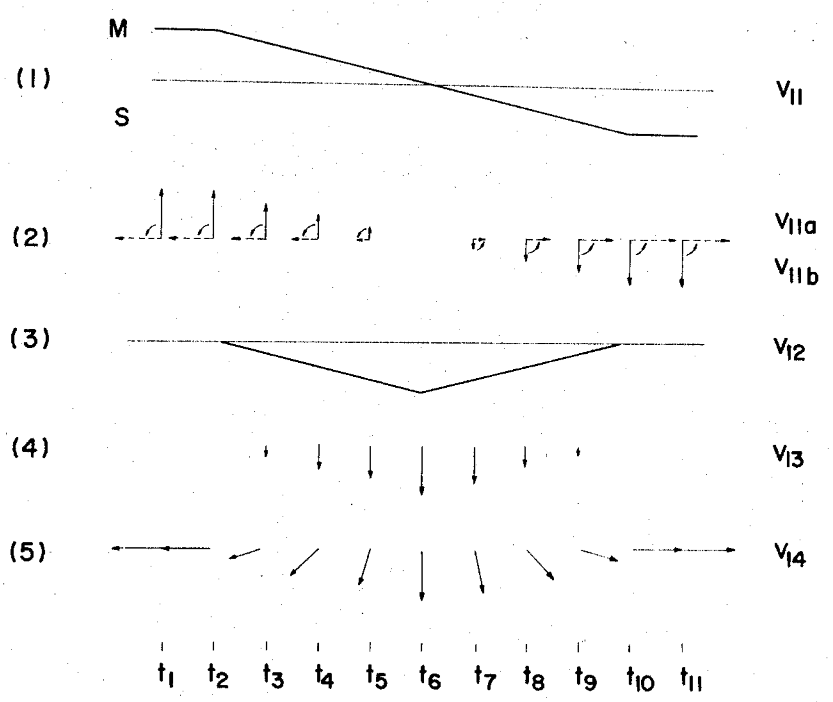

FIG. 4 shows waves and vectors for describing a superposition operation in a combiner 7. In this figure, superposition operation in the vicinity of a characteristic instant (from space to mark) of the input telegraph signal $v_2$ is shown extendedly. A wave $v_6$ shown in FIG. 4(1) is a rise portion of the telegraph signal $v_2$. Vectors $v_{7a}$ shown by heavy line in FIG. 4(2) illustrate variations of the phase position and of the amplitude at the output alternating-current signal of the balanced modulator 4, and vectors $v_{7b}$ shown by dotted line in the same figure illustrate variations of the phase position and of the amplitude at the output alternating current-signal of the phase shifter 5. A pulse signal $v_8$ shown in FIG. 4(3) corresponds to one of the pulse signals $v_3$, and vectors $v_9$ show variation of the amplitude of one of the waves $v_5$. In this case, the phase position of the vectors $v_9$ is constant as described with respect to the wave $v_5$. Accordingly, vectors $v_{10}$ illustrating the variation of phase position of the output signal of the combiner 7 are obtained by combining said vectors $v_{7b}$ and said vectors $v_9$. It is understood that a phase position of an output signal derived from the output terminal 2 rotates unidirectionally in the counter-clockwise rotation as shown in FIG. 4(5). References $t_1$ to $t_{11}$ show the progress of time. FIG. 5 shows waves and vectors for describing composition operation in the combiner 7 at a characteristic instant (from "mark" to "space") of the telegraph signal $v_2$. Illustrations (1), (2), (3), (4) and (5) of the FIG. 5 correspond, respectively, to illustrations (1), (2), (3), (4) and (5) of the FIG. 4. The phase position of the output signal of this case rotates also in the counter-clockwise direction. It can be described as follows that such unidirectional rotation of a phase position of a phase modulated wave is necessary for a single sideband phase-modulated wave.

Figure 6:
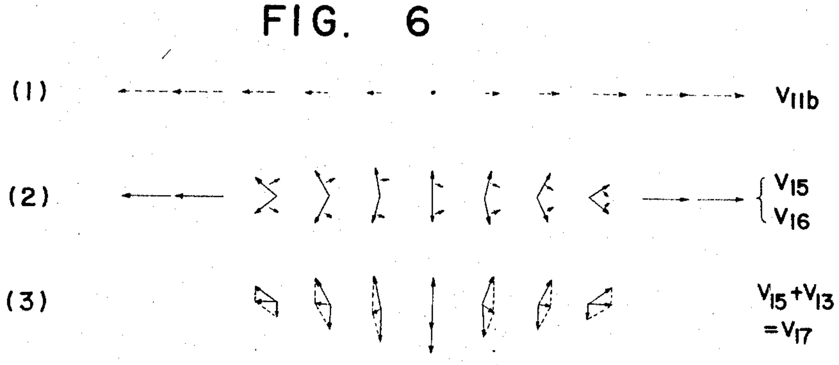

Vectors $v_{11b}$ shown in FIG. 6(1) are the same vectors 11$b$ shown in FIG. 5(2). FIG. 6(2) shows lower sideband components $v_{15}$ and upper sideband components $v_{16}$ derived from vectors $v_{11b}$. The lower sideband components $v_{15}$ rotate in a clockwise direction. However, when the vectors $v_{15}$ and the vectors $v_{13}$ are added, the resultant vectors $v_{17}$ rotate in a counter-clockwise direction as shown in FIG. 6(3). Since upper sideband components $v_{16}$ rotate in the counter-clockwise direction, the resultant vectors with respect to vectors $v_{13}$, $v_{15}$ and $v_{16}$ rotate in the counter-clockwise direction. Hence, either lower or upper sideband components can be substantially eliminated.

As can be easily understood from the above description, a single sideband phase-modulated wave can be generated by unidirectionally rotating the phase of a modulated wave at each characteristic instant of the input telegraph signal. If lower sideband components are to be obtained, the phase shifter 5 may be formed so as to shift by a magnitude of phase shift ($-\pi/2$), or the output signal of the balanced modulator 6 may be taken out in the reverse polarity.

Figure 7:
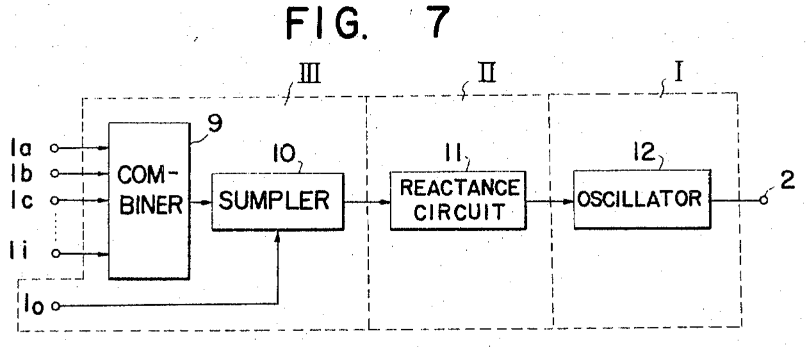
FIG. 7 is a block diagram of another embodiment of the invention.
Figure 8:
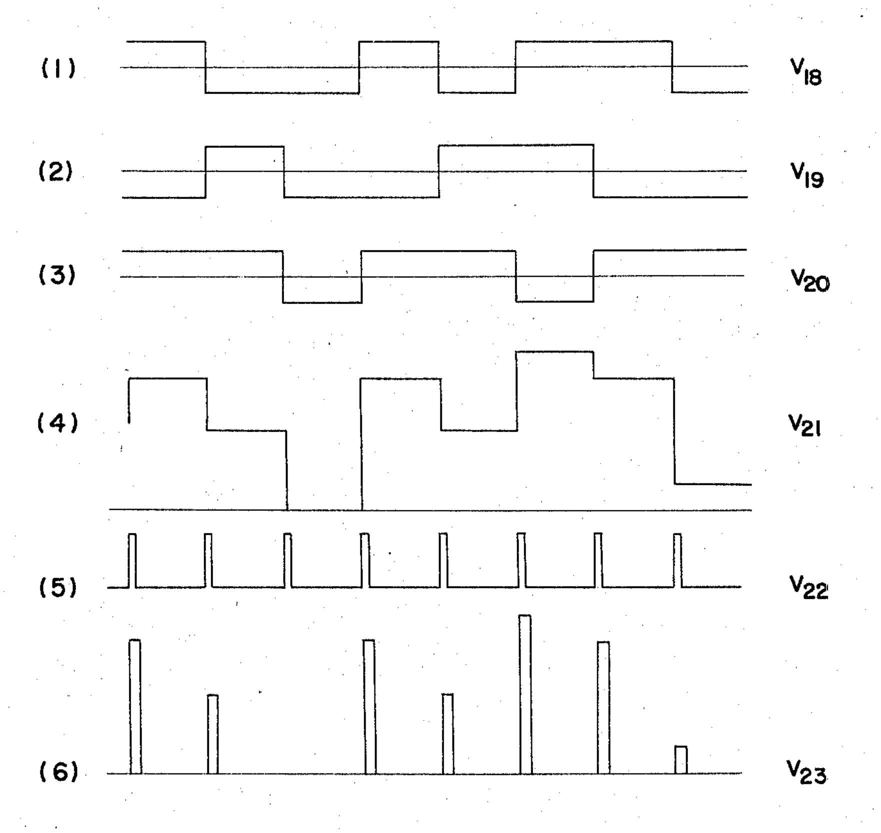
FIG. 8 are wave diagrams illustrating waves for explaining the operation of the embodiment shown in FIG. 7.

In the following description, an embodiment of the present invention, applicable to the generation of a phase modulated wave having eight-quantum phases for transmitting three telegraph signals, according to the principle illustrated in FIG. 1(A), is described. FIG. 7 shows construction of this embodiment and FIG. 8 shows waves for explaining the operation thereof. Input telegraph signals $v_{18}$, $v_{19}$ and $v_{20}$ shown in FIG. 8(1), (2) and (3) are synchronized with respect to respective code elements and applied to input terminals 1$a$, 1$b$ and 1$c$, then converted in a combiner 9 into a resultant signal $v_{21}$ as shown in FIG. 8(4). The principle of this signal conversion is shown in Table 1 in which there are the eight combinations. The combined signal $v_{21}$ is sampled in a sampler 10 by sampling pulses $v_{22}$ (FIG. 8(5)) applied from an input terminal 1$_o$, thereby to obtain a sampled signal $v_{23}$ (FIG. 8(6)) in the output side of the sampler 10. The sampled signal $v_{23}$ is impressed on a reactance circuit 11 and controls the reactance circuit 11 so as to impart, to an output wave of an oscillator 12, predetermined phase shifts according to the reactance variation of the circuit 11. In the case when it is assumed that the angular frequency of free oscillation is $\omega_o$, the phase of the output modulated wave corresponds to a phase position $(\omega_o+\Delta\omega(t))$; where $\Delta\omega(t)$ is the deviation component caused by modulation. Since it is not necessary to take into consideration the component $\omega_o t$ when only the phase shift component is considerable, phase variation $\varphi(t)$ of the output signal is expressed as follows:

$$\varphi(t)=\int\Delta\omega(t)dt \quad (1)$$

Therefore, when a rectangular pulse $v_{23}$ shown in FIG. 8(6) is employed as a control signal of the reactance circuit 11, the phase shift magnitude $\omega$ and the necessary time $t$ for phase shift are to be so selected that the phase shift magnitude $\Delta\omega$ required is equal to $\Delta\omega t$. In order to obtain a phase-modulated wave of eight-quantum phases having phase differences ($\pi/4$) in the case, for example, $t$=0.001 second, the sensitivity of the reactance control circuit is adjusted so as to satisfy the condition:

TABLE 1

| Polarity of the first telegraph signal | Polarity of the second telegraph signal | Polarity of the third telegraph signal | Relative amplitude of sampled signal | Frequency deviation (Δf), cycles/second | Magnitude of phase shift in quantum phase (radian) |
|---|---|---|---|---|---|
| − | − | − | 0 | 0 | 0 |
| − | − | + | 1 | 125 | $-\pi/4$ |
| − | + | − | 2 | 250 | $-\pi/2$ |
| − | + | + | 3 | 375 | $-3\pi/4$ |
| + | − | − | 4 | 500 | $\pi$ |
| + | − | + | 5 | 625 | $+3\pi/4$ |
| + | + | − | 6 | 750 | $+\pi/2$ |
| + | + | + | 7 | 875 | $+\pi/4$ |

$\omega=\Delta\varphi/t$, as shown in Table 1. It is understood from Table 1 that when $\Delta f=500$ cycles/second, $$\Delta\omega t=2\pi\times500\times0.001=\pi$$

Of course, when the polarity of the pulse signal $v_{23}$ is inverted, both the direction of phase shift and produced side of upper or lower sideband are inverted.

As abovementioned, the system of this invention comprises the carrier wave generator I, the phase modulator II and the control signal generator III. The control signal generator III generates one control signal corresponding to the combination of instantaneous polarities of telegraph signals to be just succeedingly transmitted while the $2^n$ number of control signals each corresponding to the $2^n$ number of combinations of instantaneous polarities of the $n$ number of telegraph signals. In this case the telegraph signals are synchronized with respect to every code element, if necessary, as are shown by $v_{18}$, $v_{19}$ and $v_{20}$ in FIG. 8. Said means is combined so that the carrier wave generator I is controlled by means of the phase modulator II by the use of the output signal of the control signal generator so as to obtained a phase-modulated signal unidirectionally shifted. In the following embodiments, said means I, II, III and IV are designated by dotted enclosures, means IV including means I and II.

Figures 9, 10:
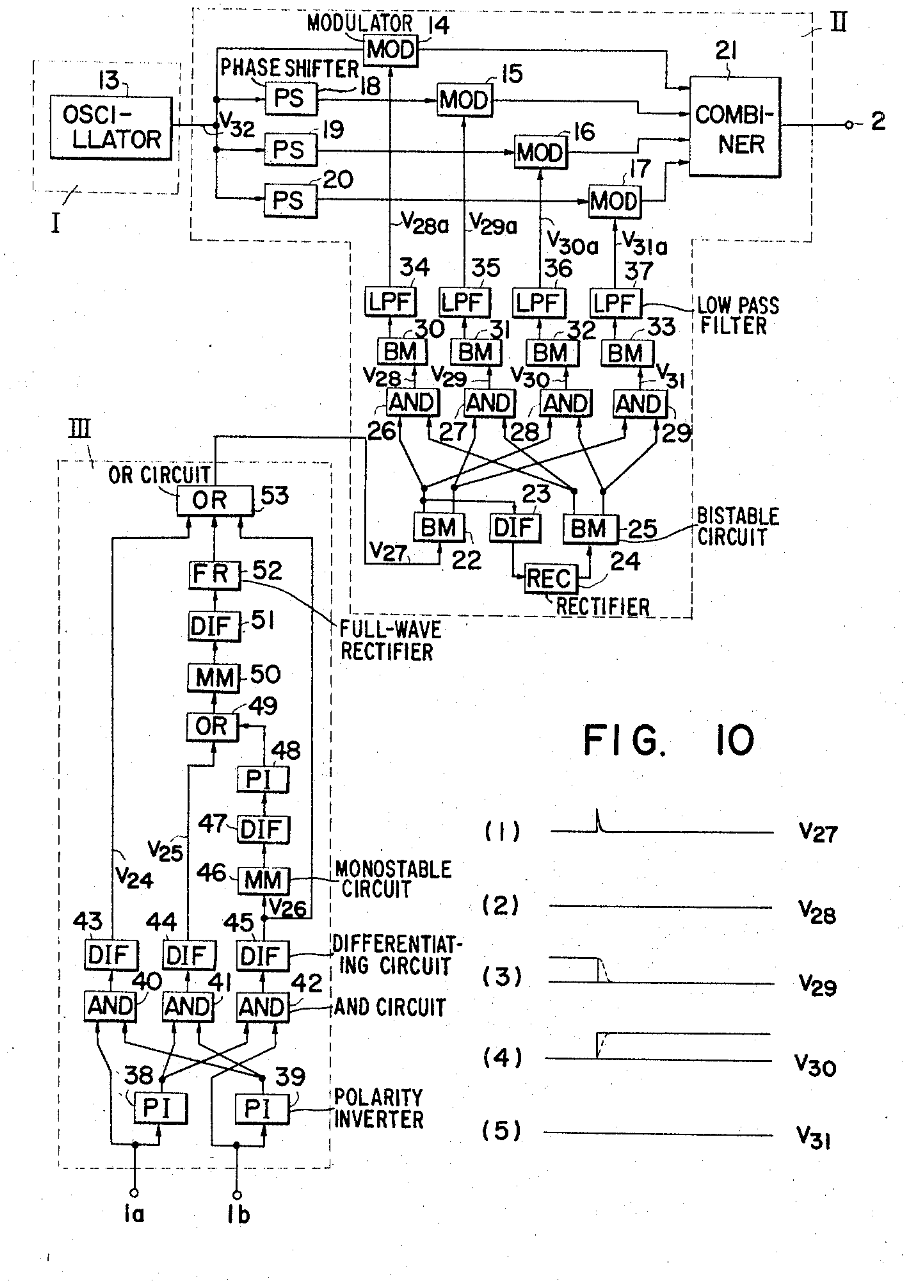
FIG. 9 is a block-diagram for showing an embodiment of the invention applicable to the production of four-phase modulated waves.
FIGS. 10, 11 and 12 are wave diagrams illustrating waves for explaining the operation of the embodiment shown in FIG. 9.

FIG. 9 shows an embodiment of this invention applicable to the generation of a phase modulated signal having four-quantum phases for transmitting two telegraph signals. Input signals A and B applied to input terminals 1*a* and 1*b* and, if necessary, synchronized with respect to every code element, are introduced into a control signal generator III. The instantaneous polarities of said input telegraph signals A and B are inverted in polarity inverters 38 and 39 and applied, together with input telegraph signals A and B as shown in FIG. 9, to AND circuits 40, 41 and 42 which operate by positive pulses. The output pulses of these AND circuits are differentiated by differentiating circuits 43, 44 and 45, thereby to obtain the following pulse signals at the output sides thereof.

(1) In the case of M*a*S*b* (the signal A is "mark," and the signal B is "space"): a pulse signal $v_{24}$ is produced at the output side of the differentiating circuit 43.

(2) In the case of S*a*S*b* (both the signals A and B are "space"): a pulse signal $v_{25}$ is produced at the output side of the differentiating circuit 44.

(3) In the case of S*a*M*b* (the signal A is "space" and the signal B is "mark"): a pulse signal $v_{26}$ is produced at the output side of the differentiating circuit 45.

(4) In the case of M*a*M*b* (both the signals A and B are "mark"): no output signal is produced at any output side of any differentiating circuit.

The pulse signal $v_{24}$ is applied, as it is, to an OR circuit 53. The pulse signal $v_{25}$ is impressed, through an OR circuit 49, on a monostable circuit 50 such as a monostable multivibrator. After receipt of the input signal thereof, the monostable circuit 50 is restorable in a very much shorter time, approximately 1/100 to 5/100, than the duration of the code-element. Accordingly, the output signal of this circuit 50 is differentiated in a differentiating circuit 51 the output signal of which is rectified in a full-wave rectifier 52, whereby sequential two pulse signals are impressed on the OR circuit 53. Another pulse signal $v_{26}$ is applied to a monostable circuit 46 and directly applied to the OR circuit 53. The monstable circuit 46 has the same characteristic as that of the monostable circuit 50 and generates an output signal which is differentiated in a differentiating circuit 47. Accordingly, a positive pulse signal is generated, at the output side of a polarity inverter 48, delayed by the restoration time of the monostable circuit 46 after generation of the pulse signal $v_{26}$. Since the output pulse signal reaches to the OR circuit 53 through the same operation as that of the signal $v_{25}$, sequential three pulse signals are obtained at the output side of the OR circuit 53 in the case of the generation of the pulse signal $v_{26}$.

Figure 11:
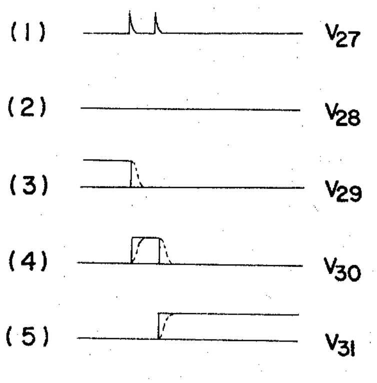
Figure 12:
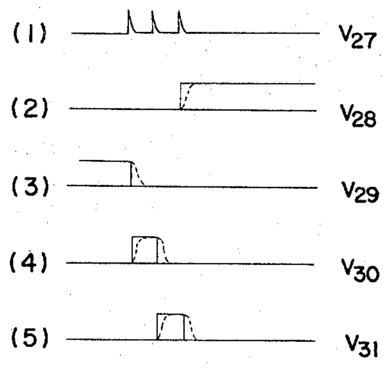

An output pulse signal of the control signal generator III is impressed, from the OR circuit 53, on a bistable circuit 22, such as a bistable multivibrator of the phase shifter II. The output signal of the bistable circuit 22 is differentiated, in a differentiating circuit 23, into a pulse signal which is rectified by a rectifier 24 and then applied to a bistable circuit 25. Outputs of the bistable circuits 22 and 25 are impressed on AND circuits 26, 27, 28 and 29 as shown in FIG. 9. Since circuits 22 to 29 constitute a ring counter, output positive signals $v_{28}$, $v_{29}$, $v_{30}$ and $v_{31}$ are sequentially generated in the order of AND circuits 26, 27, 28 and 29 for every application of a pulse signal into the bistable circuit 22. FIGS. 10, 11 and 12 show operations, respectively, in the cases of the one, two and three pulses of the output signal $v_{27}$. In all FIGS. 10, 11 and 12, the operations are those in the case wherein the signal $v_{27}$ is applied when the output signal $v_{29}$ of the AND circuit 27 exists. On the other hand, a carrier wave $v_{32}$ derived from an oscillator of the carrier wave generator I is introduced to amplitude modulators 14, 15, 16 and 17. Phase shifters 18, 19 and 20 are employed for modulators 15, 16 and 17 to shift, respectively, by $(-\pi/2)$, $(\pi)$ and $(+\pi/2)$, the carrier wave $v_{32}$. Signals $v_{28}$, $v_{29}$, $v_{30}$ and $v_{31}$ are introduced, through respectively bistable circuits 30, 31, 32 and 33 and low-pass filters 34, 35, 36 and 37, to modulators 14, 15, 16 and 17. Output signals of said low-pass filters 34, 35, 36 and 37 are illustrated by dotted lines in FIGS. 10, 11 and 12. Input signals of the modulators 14, 15, 16 and 17 are amplitude-modulated at a predetermined modulation factor in accordance with combinations of the instantaneous polarities M*a*M*b*, M*a*S*b*, S*a*M*b* and S*a*S*b* with respect to input telegraph signals A and B. That is, when the combination of instantaneous polarity is M*a*M*b*, there is no variation in the control signal. When the combination is any of M*a*S*a*, S*a*M*b* and S*a*S*b*, control signals $v_{28a}$, $v_{29a}$, $v_{30a}$ and $v_{31a}$ are applied respectively to said modulators, so that waves amplitude-modulated in accordance with the amplitude of the control signals are obtained from the output side of said modulators and applied to combiner 21. These amplitude modulated waves are combined in the combiner 21 and transmitted from the output terminal 2. More particularly, the operations are as follows:

(1) The case of M*a*S*b* (FIG. 10).—FIG. 10 shows the operation in the case in which telegraph signals A and B having a combination M*a*S*b* are applied when a control signal $v_{29}$ exists. In this case, after the control signal $v_{29}$ is eliminated, the control signal $v_{30}$ is generated as are shown in the figure. In other words, after an output signal of the modulator 15 shifted by $(-\pi/2)$ is eliminated, an input signal of the modulator 16 shifted by $(\pi)$ is passed through modulator 16. Accordingly, the output signal of the combiner 21 assumes successive phase positions $(-\pi/2)$ and $(\pi)$.

(2) The case of S*a*M*b* (FIG. 11).—The signal $v_{27}$ is of two pulses in the case shown in FIG. 11(1), in which case a control signal V 31*a* is further generated in accordance with elimination of the control signal which is generated in response to termination of the control signal $v_{29}$. In other words, the above-mentioned output signal of the modulator 16 is eliminated after termination of the control signal $v_{29}$, and an input signal of the modulator 17 shifted by $(+\pi/2)$ is introduced to the combiner 21. According to this operation, the output signal of the combiner 21 assumes successive phase positions $(-\pi2)$, $(\pi)$ and $(-\pi/2)$.

(3) The case of S*a*S*b* (FIG. 12).—Since the signal $v_{27}$ has three pulses, an output signal having no phase-shift is finally introduced, through the modulator 14, to the combiner 21.

Accordingly, the output signal of the combiner 21 assumes successive phase positions $(-\pi2)$, $(\pi)$, $(+\pi/2)$ and $(0)$.

Figure 13:
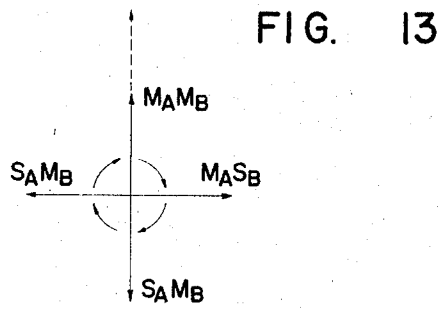
FIG. 13 is a vector diagram for describing a phase modulated wave having four-quantum phases containing information in the relative phase of two adjacent unit-elements.
Figure 15A:
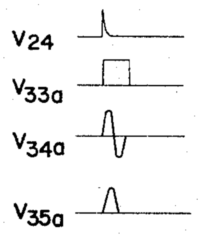
Figure 15B:
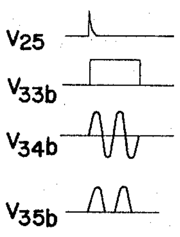
Figure 15C:
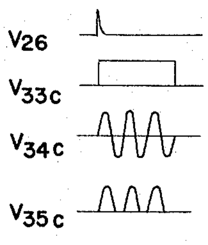

As the result of the operation of the embodiment shown in FIG. 9, the carrier was $v_{32}$ is unidirectionally shifted by the predetermined magnitude of phase-shift, as shown in FIG. 13, in accordance with combinations *MaMb*, *MaSb*, *SaMb* and *SaSb* of instantaneous polarities of telegraph signals A and B, thereby to obtain a single sideband phase-modulated wave which includes four-quantum phases and contains information in the relative phase of two adjacent code-elements.

Figures 16A, 16B, 16C, 16D:
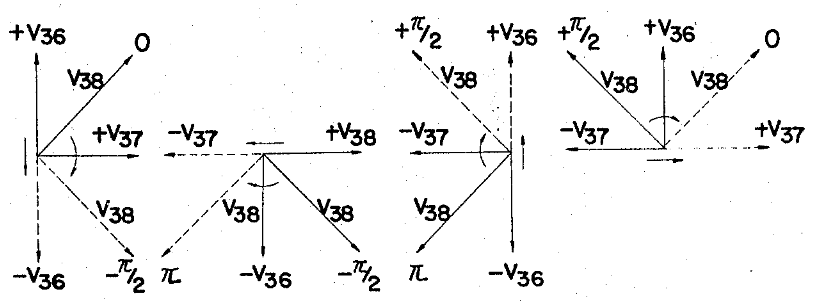

FIG. 14 shows another embodiment for generating a single-side band phase-modulated wave which includes four-quantum phases and contains information in the relative phase of two adjacent code elements. Circuits 38 to 45 are the same as those of embodiment shown in FIG. 9. In this embodiment, pulse signals $v_{24}$, $v_{25}$ and $v_{26}$ drive, respectively, monostable circuits 54, 55 and 56 which produce respective output signals thereof $v_{33a}$, $v_{33b}$ and $v_{33c}$. (FIGURES 15(A), (B) and (C)). These output signals $v_{33a}$, $v_{33b}$ and $v_{33c}$ control start-stop oscillators 57, 58 and 59, such as ringing circuits or blocking oscillators, so as to obtain outtain output signals $v_{34a}$, $v_{34b}$ and $v_{34c}$, which are rectified by rectifiers 60, 61 and 60, thereby to obtain signals $v_{35a}$, $v_{35b}$ and $v_{35c}$. These signals $v_{35a}$, $v_{35b}$ and $v_{35c}$ correspond to the pulse signal $v_{27}$ as shown in FIG. 9 and possess one of four combination conditions including no signal condition corresponding respectively to four combinations of instantaneous polarities with respect to input telegraph signals A and B. The next stage composed of AND circuits 26, 27, 28 and 29 and bistable circuits 63 and 64 constitutes a ring counter having a substantially similar function as that of circuits 22 to 29 in FIG. 9. In this ring counter, two output signals are obtained at the output sides of the bistable circuits 63 and 64; the two output signals being introduced, respectively through low-pass filters 65 and 66, to respective balanced modulators 68 and 69 such as ring modulators. A phase shifter 67 has a magnitude of phase shift ($\pi/2$). FIGS. 16(A), (B), (C) and (D) show phase-shift operations in the balanced modulators 68 and 69 in which phases of their input signals are shifted by ($\pi$) so as to obtain respective output signals $+v_{36}$ (or $-v_{36}$) and $+v_{37}$ (or $-v_{37}$), thereby to obtain, at the output terminal 2 of the combiner 21, a phase-modulated wave $v_{38}$ which has four quantum phases and contains information in the relative phase of two adjacent code elements.

FIG. 16(A) shows the phase-shift operation in which, when an output signal $v_{38}$ of 0 phase is being produced by the adding of waves $+v_{36}$ and $v_{37}$, the wave $+v_{36}$ is shifted, in the modulator 69, into the wave $-v_{36}$, thereby producing an output signal $v_{38}$ of ($-\pi/2$) phase positions. In FIGS. 16(B), (C) and (D) there are indicated, phase-shift operations corresponding, respectively, to ($-\pi/2$) phase to ($\pi$) phase, ($\pi$) phase to ($+\pi/2$) phase, and ($+\pi/2$) phase to (0) phase. In any case of FIGS. 9 and 14, it is desirable that unidirectional phase shift operation be carried out in a much shorter time than the duration of a code element of the input telegraph signal in order to minimize the telegraph distortion of the phase-modulated wave. For this purpose, it is suitable to adopt a short duration and a narrow spacing of the control pulse signal $v_{27}$.

An embodiment of this invention which has a phase shifter II using a variable phase shifter V will now be described hereinbelow. When signals having different frequencies are passed, for example, in a band-pass filter, the passed signal is generally phase shifted by a different magnitude because transmission times for respective signals are deviated in accordance with large or small difference frequencies between the center frequency of the band-pass filter and respective signal frequencies. By utilizing this characteristic, the variable phase shifter V can be formed. This purpose of the variable phase-shift operation can be achieved by changing the signal frequency or the center frequency of the band-pass filter. FIG. 18(A) shows an embodiment for changing the signal frequency, and FIG. 18(B) shows an embodiment for changing the center frequency of the filter. In the embodiment shown in FIG. 18(A), a signal applied through an input terminal 70 is converted in frequency thereof in a frequency converter 87 by the use of a local signal derived from a variable oscillator 90. The converted signal is passed through a band-pass filter 88 and then converted again in a frequency converter 89 so that the frequency of an output signal obtained from an output terminal 71 corresponds to the frequency of said input signal. Since the variable frequency oscillator 90 is controlled by its control signals applied from a terminal 72*b* or applied, through a low-pass filter 91, from a terminal 71*a*, the frequency of the signal passing through the band-pass filter 88 is consequently varied. In the embodiment shown in FIG. 18(B), the impedance of a resonance circuit of a filter is varied by a control signal applied through a terminal 72, thereby changing the center frequency of the filter.

FIG. 17 shows an embodiment of this invention using such a variable phase shifter V for generating a phase-modulated wave including two quantum standard phases which are respectively predetermined in accordance with two possible polarities of a telegraphic signal. The operation of this embodiment will now be described with reference to FIGS. 19, 20 and 21. An output signal of an oscillator 13 is distributed, at gate circuits 73 and 75, into two signals $v_{40}$ and $v_{41}$ by the use of a telegraph signal $v_{39}$ applied from a terminal 1. On the other hand, the telegraph signal is passed through a polarity inverter 81 and rectified so as to obtain a signal $v_{44}$ which controls a variable phase shifter 77. The amplitude of the signal $v_{44}$ is established, in the variable phase shifter 77, at a suitable value in order to carry out a required phase-shift against a signal passing therethrough. The telegraph signal $v_{39}$ is further differentiated in a differentiating circuit 79, the output signal of which becomes a signal $v_{43}$ through rectification by a rectifier 83 and wave shaping by a monostable circuit 86, or becomes a signal $v_{42}$ through a polarity inverter 80, a rectifier 82 and a monostable circuit 85.

Production of output signals $v_{45}$ and $v_{46}$ of said variable phase shifters 76 and 77 are described hereinbelow. FIGS. 20 and 21 show respectively 0 phase-to-$\pi$ phase shift and phase-to-0 phase shift, each being shown extendedly for comprehensible illustration. Vectors $v_{47a}$ (or $v_{47b}$), $v_{48a}$ (or $v_{48b}$), $v_{49a}$ (or $v_{49b}$) and $v_{50a}$ (or $v_{50b}$) correspond respectively to the output wave of the shifter 76 with respect to the just succeeding unit element, the vector showing the amplitude and the phase position of build-up signal of the signal $v_{47a}$ (or $v_{47b}$), the output wave of the shifter 77 with respect to the just preceding code element, and vectors showing the amplitude of the signal $v_{46}$ and the phase position which is rotating in accordance with control by the signal $v_{43}$. Accordingly, by adding in a combiner 78, an output signal $v_{51a}$ (or $v_{51b}$) the phase of which is unidirectionally rotated can be obtained at an output terminal 2.

A system for generating a single side-band phase-modulated wave from a both sideband phase-modulated wave is described hereinbelow. FIG. 22 shows an embodiment of the present invention for producing a single sideband phase-modulated wave including two quantum standard phases; FIG. 23 shows the operation thereof. A continuous wave having a stable phase position derived from a carrier wave oscillator 13 is phase-modulated by the use of a telegraph signal $v_{52}$ in a phase modulator 92, thereby becoming a wave $v_{56}$ which is further distributed at gate circuits 93 and 96 into such waves $v_{57}$, $v_{58}$ as shown. On the other hand, the telegraph signal $v_{52}$ is converted into a pulse signal $v_{53}$ in a differentiating circuit 99. This pulse signal $v_{53}$ is converted into a pulse signal $v_{54}$ through a rectifier 101 and a monostable circuit 103 and converted into a pulse signal $v_{55}$ through a rectifier 102 and a monostable circuit 104. In this case, the waves $v_{57}$ and $v_{58}$ applied to the variable phase shifters 94 and 97 as above mentioned are respectively converted into waves $v_{59}$ and $v_{60}$ by the control of the pulse shifter 94 or 97; the waves $v_{59}$ and $v_{60}$ being combined in a combiner 21. The operation can be summarily described as follows: (1) a both sideband phase-modulated wave is divided into different telegraph waves (two groups) each having the same position with respect to the same group; (2) the phase position of terminational part of each signal element of one group is unidirectionally rotated; (3) said terminational part is combined with the initial part of each telegraph signal element of the other group. As a result of the above-mentioned operation, a single sideband phase-modulated wave can be obtained.

FIG. 24 shows an embodiment of this invention for generating, by the use of a both sideband phase modulated wave, a single sideband phase-modulated wave which has four quantum phases and contains information in the relative phase of two adjacent code elements. In this case, however, said both sideband phase modulated wave is modulated so as to have its information in the relative phase of adjacent two code element. FIG. 25 shows waves for describing the operation of this embodiment. When telegraph signals $v_{61}$ and $v_{62}$ are applied to terminals **1*a* and 1*b*, the following signals are generated, through polarity inverters 106 and 107 as shown, at output sides of AND circuits 108, 109 and 110. That is, an output signal of a corresponding one of AND circuits 108, 109 and 110** is generated in accordance with combinations of instantaneous polarities M*a*S*b*, S*a*S*b*, S*a*M*b* of said telegraph signals $v_{61}$ and $v_{62}$. Variable resistance circuits 111, 112 and 113 control, respectively, levels of output signals of AND circuits 108, 109 and 110 so that variable phase shifters 94 and 97 respectively carry out required phase shifts. The output signals of said circuits are, for example, signals $v_{63}$, $v_{64}$ and $v_{65}$. Examples of combinations of instantaneous polarities of said telegraph signals A and B and amplitudes of these pulse signals $v_{63}$, $v_{64}$ and $v_{65}$ are shown on Table 2.

TABLE 2

| Combination of polarities with respect to telegraph signals "A" and "B" | Magnitude of phase deviation relative to the preceding code element | Relationship relating to magnitudes of drive signals | Pulse signal |
|---|---|---|---|
| MM | 0 | (1) | -------- |
| MS | $\pi/2$ (or $-\pi/2$) | 1/3 | $v_{63}$ |
| SS | $\pi$ (or $-\pi$) | 2/3 | $v_{64}$ |
| SM | $3\pi/2$ (or $-3\pi/2$) | 1 | $v_{65}$ |

1 No pulse.

A phase modulated wave including four quantum phases has been described in conjunction with FIG. 13; therefore a detailed description thereof is herein omitted.

On the other hand, clock pulses the period of which is the same as the duration of code element of the telegraph signals $v_{61}$ and $v_{62}$ are applied to a terminal **1*c*. The clock pulses are then converted into two state-signals $v_{67}$ and $v_{68}$ in a bistable circuit 116 such as a flip-flop circuit. The state-signal $v_{68}$ is converted into a pulse signal $v_{69}$ in a differentiating circuit 117. The pulse signal $v_{69}$ is converted successively into signals $v_{70}$ and $v_{72}$, or signals $v_{71}$ and $v_{73}$ through a rectifier 119 and a monostable circuit 121, or a polarity inverter 118, a rectifier 120 and a monostable circuit 122. Pulse signals $v_{74}$ and $v_{75}$ are obtained by gating, with said pulse signals $v_{72}$ and $v_{73}$, said pulse signals $v_{63}$, $v_{64}$ and $v_{65}$ at gate circuits 114 and 115. On the other hand, a both sideband phase-modulated wave is distributed, as described in conjunction with FIG. 14, at gate circuits 93 and 96**. Waves $v_{76}$ and $v_{77}$ shown in FIG. 25 correspond to these distributed waves. The operation in this case with respect to signals $v_{74}$, $v_{75}$, $v_{76}$ and $v_{77}$ is as follows: (1) at a time $t_1$, since the polarity of the succeeding code element is M*a*M*b*, the phase position of a signal SS of the wave $v_{77}$ is continued as it is, due to the absence of control signals $v_{74}$ and $v_{75}$; (2) at a time $t_2$, since the polarity of the succeeding code element is M*a*M*b*, the phase of the signal MM is shifted, as shown in Table 2, by $(\pi/2)$ by means of the first pulse of the pulse signal $v_{74}$ derived from the signal $v_{63}$, thereby corresponding to the phase of a just succeeding signal MS; (3) at a time $t_3$, since the polarity of the succeeding code element is S*a*M*b*, the phase position of the signal MS is shifted by $(3\pi/2)$ by the first pulse of the signal $v_{75}$, thereby corresponding to the phase of a just succeeding signal SM; and (4) at a time $t_4$, since the polarity of the succeeding code element is S*a*S*b*, the phase position of the signal MS is shifted by $(\pi)$ by means of second pulse of the signal $v_{74}$, thereby corresponding to the phase of the signal SS. As a result of this operation shown in FIG. 25, the phase of the just preceding code element is unidirectionally shifted at every characteristic instant in accordance with the polarity of the just succeeding code element such as MM, MS, SM and SS, and further made to correspond to the phase of the just succeeding code element at the output side of the combiner 21. The signal wave derived from the combiner 21 is the required phase-modulated wave. The shaper 98 is employed for establishing the amplitude of the modulated wave if necessary.

In this paragraph, the phase shifter II of this invention adapted to use amplitude modulation is described. FIG. 26 shows such an element, and FIG. 27 shows waves for describing the operation thereof. For the purpose of comprehensible illustration, the vicinity of transition instants of phase position are illustrated extendedly. A carrier wave oscillator 13 is controlled with a phase modulator 127 controlled by a telegraph signal applied through the terminal 1 so as to generate a both sideband phase-modulated wave $v_{83}$. This wave $v_{83}$ is applied to an amplitude modulator 126 and modulated into a modulated wave $v_{81}$ by the use of a control wave $v_{78}$ (FIG. 27(1)) applied through a terminal $P_1$. On the other hand, the wave $v_{83}$ is sampled, at a gate circuit 123 at every characteristic instant, by a pulse signal $v_{79}$ applied through a terminal $P_2$. The sampled signal is applied to a variable phase shifter 124. In this shifter 124, substantially the same operation as described above is carried out. More particularly described, the phase position of the sampled signal is shifted, by a required magnitude as shown in Table 2, by a control signal applied through a terminal $P_3$, and the shifted signal is applied to a gate circuit 125 which generates a signal $v_{82}$ by the use of a gate signal $v_{80}$ applied through a terminal $P_4$. The signals $v_{81}$ and $v_{82}$ are added in a combiner 21, and the required single sideband phase-modulated wave is obtained. Detailed description of this addition operation is omitted here because it is substantially the same in principle described referring to FIGS. 3, 4 and 5.

While particular embodiments of this invention have been described and shown, it will, of course, be understood that it is not to be limited thereto, since many embodiments and modifications may be made of this invention; therefore, it is contemplated by the appended claims to cover all such embodiments and modifications as fall within the true spirit and scope of this invention. Examples of such embodiments, modifications and further information are described hereinafter. In the system of this invention, the phase shifter II can be constructed by the use of a delay circuit shiftable of the phase of a continuous carrier-wave. Output signals of the control signal generator III take the $2^n$ number of states including zero state with respect to the control signals; where $n$ is the number of input telegraph signals to be transmitted. Hence, control signals of another type can be employed. In order to carry out transmission of information with minimum telegraph distortion, however, very shorter build-up or fall-down time of the transmitting telegraph signal is required. Therefore, a pulsive signal having very much shorter duration than the code element of the telegraph signals is suitable for the control signal. Although pulse signals modulated by PAM (pulse amplitude modulation) and PNM (pulse number modulation) is employed as the control signal in the above-mentioned system, other control pulse signals modulated by other modultaion system types, of course, can be employed. With respect to the number of each control signal such as "0," "1," "2" and "3," other combinations of the numbers of controls may be adopted.

The principle of this invention can be applied to a system for generating any phase-modulated wave including multi-quantum phases, such as eight-quantum phase, sixteen quantum phases . . . $2^n$ number of quantum phases. Information transmitted by the phase-modulated wave of this invention can be contained in the modulated phase positions themselves or in the relative phase of two adjacent code elements of modulated wave.

In the above mentioned description, the phase-modulated wave comprises only one carrier wave. However, generation systems of this invention can be applied to generate a plurality of single sideband phase-modulated waves arranged with a frequency allocation of $(1/T)$ cycle/second; where T is substantially equal to the duration of code element. In this case, respective telegraph signals to be transmitted are necessary to synchronize all code elements with one another. If this generation system is coupled with an opposite demodulation system, such as systems proposed in the U.S. patent application Ser. No. 284,988 filed on June 3, 1963 (in the British patent application No. 22,025/63 filed on May 31, 1963, or in the German patent application No. K 49,884), an excellent telecommunication system can be obtained in which maximum information can be transmitted, by the use of a narrow transmission band, without great effect of noise in the transmission line. Accordingly, the systems of this invention are suitable for telecommunication in the case of long transmission lines such as submarine cable line and in the case of space communication.

What we claim is:

1. A system for generating a single-sideband phase-modulated telegraphic wave; comprising means for generating a continuous sinusoidal wave; control means for producing, in response to significant instants of a telegraphic signal, a control signal including two kinds of pulse signals determined respectively in accordance with the two possible instantaneous polarities of the telegraphic signal; and phase-shift means for successively applying to a phase position of said continuous sinusoidal wave, in one and the same direction in response to the control signal, phase shifts determined in accordance with the two possible instantaneous polarities of the telegraphic signal.

2. A system for generating a single-sideband phase-modulated telegraphic wave according to claim 1, in which the continuous sinusoidal wave has a stable phase position, the control signal comprises differentiated pulses of the telegraphic signal, and the phase-shift means comprises a first phase-modulator for successively phase-modulataing the stable phase position of the continuous sinusoidal wave in accordance with the two possible polarities of the telegraphic signal, a phase-shifter for phase shifting by $\pi/2$ the output signal of the first phase-modulator, a second phase-modulator for gating the continuous sinusoidal wave in accordance with the amplitude of the differentiated pulses and phase-modulating said gated wave in accordance with the polarities of the differentiated pulses, and a combiner for superposing the output signal of the phase-shifter on the output signal of the second phase-modulator to obtain the single sideband phase-modulated wave having two quantum phase positions.

3. A system for generating a single-sideband phase-modulated telegraphic wave according to claim 1, in which the continuous sinusoidal wave has a stable phase position, said control signal comprising a modified telegraphic signal and two pulse trains, the modified telegraphic signal having successive polarities inverted relative to successive polarities of the first-mentioned telegraphic signal, means generating each pulse of one of the two pulse trains being generated at each space-to-mark significant instant of the telegraphic signal and means generating each pulse of the other of the two pulse trains at each mark-to-space significant instant of the telegraphic signal, and the phase-shift means comprises two gate circuits for distributing the continuous sinusoidal wave into two signals in accordance with the two possible polarities of the telegraphic signal, a first variable phase shifter for phase-shifting one of said distributed signals in accordance with one of two pulse trains, a second variable phase shifter for phase-shifting the other of said distributed signals in accordance with the other of two pulse trains and the inverted signal of the telegraphic signal, and a combiner for superposing the output signal of the first variable phase-shifter on the output signal of the second variable phase-shifter to obtain the single sideband phase-modulated wave having two quantum phase positions.

4. A system for generating a single-sideband phase-modulated telegraphic wave according to claim 1, in which the continuous sinusoidal wave is of a both-sideband phase-modulated telegraphic wave, and the phase-shift comprises means to eliminate either of the both-side-band components by rotating the phase position of the both-sideband phase-modulated wave in one and the same direction in response to the control signal.

5. A system for generating a single-sideband phase-modulated telegraphic wave; comprising means for generating a continuous sinusoidal wave; control means for producing, in response to significant instants of any of $n$ telegraphic signals, a control signal including $2^n$ kinds of pulse signals determined respectively in accordance with $2^n$ combinations of two respective possible instantaneous polarities of $n$ telegraphic signals; and phase-shift means for successively applying to a phase position of the continuous sinusoidal wave, in one and the same direction in response to the control signal, phase shifts determined in accordance with the $2^n$ combinations of two respective possible instantaneous polarities of the $n$ telegraphic signals.

6. A system for generating a single-sideband phase-modulated telegraphic wave according to claim 5, in which the continuous sinusoidal wave has a stable phase position, and the phase-shift means is composed of a plurality of phase-shifters for deriving $2^n$ continuous sinusoidal waves respectively having $2^n$ quantum phase positions from the continuous sinusoidal wave, $2^n$ amplitude-modulators for respectively passing $2^n$ continuous waves in response to the $2^n$ kinds of pulse signals thereby selecting the $2^n$ continuous sinusoidal waves so as to assume successive quantum phase positions rotated in one and the same direction, and a combiner for adding all of the output signals of the $2^n$ amplitude-modulators.

7. A system for generating a single-sideband phase-modulated telegraphic wave according to claim 5, in which the continuous sinusoidal wave has a stable phase position, and the phase-shift means comprises means for deriving $2^n/2$ continuous sinusoidal waves respectively having $2^n/2$ quantum phase positions from the continuous sinusoidal wave, $2^n/2$ phase-modulators respectively phase-modulating by $\pi$ the $2^n/2$ continuous sinusoidal waves in response to the $2^n$ kinds of pulse signals, and a combiner for adding the output signals of the $2^n/2$ phase modulators which phase-modulate the $2^n/2$ continuous sinusoidal waves so as to assume, at the output of the output of the combiner, successive quantum phase positions rotated in one and the same direction.

8. A system for generating a single-sideband phase-modulated telegraphic wave according to claim 5, the continuous sinusoidal wave is of a both-sideband phase-modulated telegraphic wave, and the phase-shift means comprises means to eliminate either of the both-sideband components by rotating the phase position of the both-sideband phase-modulated wave in one and the same direction in response to the control signal.

9. A system according to claim 5, in which said phase shift means comprises means to cause said phase shifts to be so determined that information is involved in relative phase positions between quantum phase positions of adjacent code elements of the single-sideband phase-modulated telegraphic wave.

10. A system according to claim 5, in which said phase shift means comprises means to cause said phase shifts to be so determined that information is involved in the instantaneous phase positions of the single-sideband phase-modulated telegraphic wave.

References Cited

UNITED STATES PATENTS

| | | | |
|---|---|---|---|
| 3,234,330 | 2/1966 | Lee | 178—67 |
| 3,128,343 | 4/1964 | Baker | 178—67 |
| 3,131,363 | 4/1964 | Landee et al. | 325—163 X |
| 3,225,316 | 12/1965 | Saraga | 325—137 X |

ROBERT L. GRIFFIN, *Primary Examiner.*

JOHN W. CALDWELL, *Examiner.*

J. T. STRATMAN, *Assistant Examiner.*